US009244166B1

United States Patent
Finley et al.

(10) Patent No.: US 9,244,166 B1
(45) Date of Patent: Jan. 26, 2016

(54) SYSTEM AND METHOD FOR ICE DETECTION

(71) Applicants: Jeffery A. Finley, Cedar Rapids, IA (US); Kevin M. Kronfeld, Cedar Rapids, IA (US); Gregory J. Koenigs, Cedar Rapids, IA (US); Roy E. Robertson, Marion, IA (US)

(72) Inventors: Jeffery A. Finley, Cedar Rapids, IA (US); Kevin M. Kronfeld, Cedar Rapids, IA (US); Gregory J. Koenigs, Cedar Rapids, IA (US); Roy E. Robertson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 403 days.

(21) Appl. No.: 13/841,893

(22) Filed: Mar. 15, 2013

(51) Int. Cl.
*G01S 13/95* (2006.01)

(52) U.S. Cl.
CPC .................................... *G01S 13/953* (2013.01)

(58) Field of Classification Search
CPC .............................. G01S 13/953; G01S 7/062
USPC ............................................... 342/26 R–26 D
See application file for complete search history.

(56) References Cited

U.S. PATENT DOCUMENTS

| 650,275 | A | 5/1900 | Reeve |
|---|---|---|---|
| 3,251,057 | A | 5/1966 | Buehler et al. |
| 3,359,557 | A | 12/1967 | Fow et al. |
| 3,404,396 | A | 10/1968 | Buchler et al. |
| 3,465,339 | A | 9/1969 | Marner |
| 3,491,358 | A | 1/1970 | Hicks |
| 3,508,259 | A | 4/1970 | Andrews |
| 3,540,829 | A | 11/1970 | Collinson et al. |
| 3,567,915 | A | 3/1971 | Altshuler et al. |
| 3,646,555 | A | 2/1972 | Atlas |
| 3,715,748 | A | 2/1973 | Hicks |
| 3,764,719 | A | 10/1973 | Dell |
| 3,781,530 | A | 12/1973 | Britland et al. |
| 3,781,878 | A | 12/1973 | Kirkpatrick |
| 3,803,609 | A | 4/1974 | Lewis et al. |
| 3,885,237 | A | 5/1975 | Kirkpatrick |
| 3,943,511 | A | 3/1976 | Evans et al. |
| 3,964,064 | A | 6/1976 | Brandao et al. |

(Continued)

FOREIGN PATENT DOCUMENTS

| EP | 1 329 738 B1 | 7/2003 |
|---|---|---|
| FR | 2658617 A1 | 8/1991 |

(Continued)

OTHER PUBLICATIONS

U.S. Appl. No. 14/206,239, filed Mar. 12, 2014, Rockwell Collins.

(Continued)

*Primary Examiner* — John B Sotomayor
*Assistant Examiner* — Marcus Windrich
(74) *Attorney, Agent, or Firm* — Angel N. Gerdzhikov; Donna P. Suchy; Daniel M. Barbieri

(57) ABSTRACT

A hazard warning or weather radar system or method can be utilized to determine a location of ice. The system and method can be used in an aircraft. The aircraft weather radar system can include a radar antenna and a processor. The radar antenna receives radar returns. The processor can: 1. identify on a display a region of potential ice associated with a blow off region in response to the radar returns, temperature data, and wind data; 2. identify on a display a region of potential ice associated with a stratiform region in response to radar returns, temperature data, and a history of convective cells in the stratiform region; or 3. perform both 1 and 2.

31 Claims, 4 Drawing Sheets

(56) References Cited

U.S. PATENT DOCUMENTS

| | | |
|---|---|---|
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 * | 11/2003 | Robinson et al. ............... 701/3 |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Thompson et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 * | 9/2006 | Paramore et al. ............ 342/26 B |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 * | 1/2007 | Finley et al. ................. 342/26 R |
| 7,200,491 B1 | 4/2007 | Rose et al. |
| 7,205,928 B1 | 4/2007 | Sweet |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 * | 12/2007 | Koenigs ...................... 342/26 R |
| 7,307,577 B1 | 12/2007 | Kronfeld et al. |
| 7,307,583 B1 | 12/2007 | Woodell et al. |

(56) References Cited

U.S. PATENT DOCUMENTS

| | | | |
|---|---|---|---|
| 7,307,586 B2 | 12/2007 | Peshlov et al. | |
| 7,307,756 B2 | 12/2007 | Walmsley | |
| 7,352,317 B1 | 4/2008 | Finley et al. | |
| 7,352,929 B2 | 4/2008 | Hagen et al. | |
| 7,365,674 B2 | 4/2008 | Tillotson et al. | |
| 7,372,394 B1 | 5/2008 | Woodell et al. | |
| 7,383,131 B1 | 6/2008 | Wey et al. | |
| 7,417,579 B1 | 8/2008 | Woodell | |
| 7,427,943 B1* | 9/2008 | Kronfeld et al. | 342/26 B |
| 7,471,995 B1 | 12/2008 | Robinson | |
| 7,486,219 B1 | 2/2009 | Woodell et al. | |
| 7,486,220 B1 | 2/2009 | Kronfeld et al. | |
| 7,492,304 B1* | 2/2009 | Woodell et al. | 342/26 B |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,528,613 B1 | 5/2009 | Thompson et al. | |
| 7,541,971 B1 | 6/2009 | Woodell et al. | |
| 7,557,735 B1 | 7/2009 | Woodell et al. | |
| 7,576,680 B1 | 8/2009 | Woodell | |
| 7,581,441 B2 | 9/2009 | Barny et al. | |
| 7,598,901 B2 | 10/2009 | Tillotson et al. | |
| 7,598,902 B1 | 10/2009 | Woodell et al. | |
| 7,633,428 B1 | 12/2009 | McCusker et al. | |
| 7,633,431 B1 | 12/2009 | Wey et al. | |
| 7,664,601 B2 | 2/2010 | Daly, Jr. | |
| 7,696,921 B1 | 4/2010 | Finley et al. | |
| 7,714,767 B1 | 5/2010 | Kronfeld et al. | |
| 7,728,758 B2 | 6/2010 | Varadarajan et al. | |
| 7,733,264 B1 | 6/2010 | Woodell et al. | |
| 7,859,448 B1 | 12/2010 | Woodell et al. | |
| 7,868,811 B1 | 1/2011 | Woodell et al. | |
| 7,917,255 B1 | 3/2011 | Finley | |
| 7,973,698 B1 | 7/2011 | Woodell et al. | |
| 7,982,658 B2 | 7/2011 | Kauffman et al. | |
| 8,022,859 B2 | 9/2011 | Bunch et al. | |
| 8,054,214 B2 | 11/2011 | Bunch | |
| 8,072,368 B1 | 12/2011 | Woodell | |
| 8,081,106 B2 | 12/2011 | Yannone | |
| 8,089,391 B1 | 1/2012 | Woodell et al. | |
| 8,098,188 B2* | 1/2012 | Costes et al. | 342/25 R |
| 8,111,186 B2 | 2/2012 | Bunch et al. | |
| 8,159,369 B1 | 4/2012 | Koenigs et al. | |
| 8,217,828 B2 | 7/2012 | Kirk | |
| 8,228,227 B2 | 7/2012 | Bunch et al. | |
| 8,314,730 B1* | 11/2012 | Musiak et al. | 342/25 B |
| 8,902,100 B1 | 12/2014 | Woodell et al. | |
| 2002/0039072 A1 | 4/2002 | Gremmert et al. | |
| 2003/0001770 A1 | 1/2003 | Cornell et al. | |
| 2004/0239550 A1* | 12/2004 | Daly, Jr. | 342/26 B |
| 2005/0049789 A1 | 3/2005 | Kelly et al. | |
| 2006/0036366 A1 | 2/2006 | Kelly et al. | |
| 2008/0158049 A1 | 7/2008 | Southard et al. | |
| 2009/0219197 A1 | 9/2009 | Bunch | |
| 2010/0019938 A1 | 1/2010 | Bunch | |
| 2010/0042275 A1 | 2/2010 | Kirk | |
| 2010/0194628 A1 | 8/2010 | Christianson et al. | |
| 2010/0201565 A1 | 8/2010 | Khatwa | |
| 2011/0148694 A1* | 6/2011 | Bunch et al. | 342/26 B |
| 2012/0029786 A1 | 2/2012 | Calandra et al. | |
| 2012/0133551 A1* | 5/2012 | Pujol et al. | 342/26 R |
| 2012/0139778 A1 | 6/2012 | Bunch et al. | |
| 2013/0226452 A1 | 8/2013 | Watts | |
| 2013/0234884 A1 | 9/2013 | Bunch et al. | |

FOREIGN PATENT DOCUMENTS

| | | |
|---|---|---|
| WO | WO-98/07047 A1 | 2/1998 |
| WO | WO-98/22834 | 5/1998 |
| WO | WO-03/005060 | 1/2003 |
| WO | WO-2009/137158 | 11/2009 |

OTHER PUBLICATIONS

Final Office Action on U.S. Appl. No. 13/246,769 Dated Sep. 16, 2014, 18 pages.
Non-Final Office Action on U.S. Appl. No. 13/717,052 Dated Sep. 9, 2014, 8 pages.
Notice of Allowance on U.S. Appl. No. 12/075,103 Dated Aug. 4, 2014, 10 pages.
U.S. Appl. No. 12/075,103, filed Mar. 7, 2008, Woodell et al.
Advisory Action for U.S. Appl. No. 12/075,103, mail date Feb. 13, 2013, 3 pages.
Advisory Action for U.S. Appl. No. 12/075,103, mail date Nov. 8, 2010, 3 pages.
Advisory Action for U.S. Appl. No. 12/075,103, mail date Oct. 15, 2010, 3 pages.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.ll.mit.edu/mission/aviation/faawxsystems/ciws.html, received on Aug. 19, 2009, 3 pages.
Doviak et al., Doppler Radar and Weather Observations, 1984, 298 pages.
Dupree et al.,FAA Tactical Weather Forecasting in the United States National Airspace, 29 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003, 106 pages.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000, 13 pages.
Kuntman, Airborne System to Address Leading Cause of Injuries in Non-Fatal Airline Accidents, ICAO Journal, Mar. 2000, 4 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, McGraw-Hill Book Company, New York et al., 5 pages.
Notice of Allowance for U.S. Appl. No. 10/631,253, mail date Jul. 28, 2005, 7 pages.
Notice of Allowance for U.S. Appl. No. 11/256,845, mail date May 27, 2009, 7 pages.
Notice of Allowance for U.S. Appl. No. 11/370,085, mail date Dec. 30, 2008, 6 pages.
Notice of Allowance for U.S. Appl. No. 11/402,434, mail date Nov. 4, 2008, 6 pages.
Notice of Allowance for U.S. Appl. No. 12/474,102, mail date Jan. 20, 2012, 6 pages.
Office Action for U.S. Appl. 11/256,845, mail date Aug. 21, 2007, 4 pages.
Office Action for U.S. Appl. No. 10/631,253, mail date Jan. 14, 2004, 5 pages.
Office Action for U.S. Appl. No. 10/631,253, mail date Jun. 30, 2004, 4 pages.
Office Action for U.S. Appl. No. 11/256,845, mail date Dec. 5, 2006, 5 pages.
Office Action for U.S. Appl. No. 11/256,845, mail date Jul. 28, 2008, 5 pages.
Office Action for U.S. Appl. No. 11/256,845, mail date Jun. 22, 2006, 5 pages.

(56) References Cited

OTHER PUBLICATIONS

Office Action for U.S. Appl. No. 11/370,085, mail date Aug. 15, 2007, 10 pages.
Office Action for U.S. Appl. No. 11/370,085, mail date Dec. 4, 2007, 13 pages.
Office Action for U.S. Appl. No. 11/370,085, mail date Oct. 9, 2008, 5 pages.
Office Action for U.S. Appl. No. 11/402,434, mail date Jul. 17, 2008, 5 pages.
Office Action for U.S. Appl. No. 11/402,434, mail date Mar. 29, 2007, 8 pages.
Office Action for U.S. Appl. No. 11/402,434, mail date Oct. 26, 2006, 7 pages.
Office Action for U.S. Appl. No. 11/402,434, mail date Sep. 20, 2007, 7 pages.
Office Action for U.S. Appl. No. 12/075,103, mail date Feb. 26, 2010, 11 pages.
Office Action for U.S. Appl. No. 12/075,103, mail date Jul. 29, 2010, 7 pages.
Office Action for U.S. Appl. No. 12/075,103, mail date Jun. 20, 2012, 5 pages.
Office Action for U.S. Appl. No. 12/075,103, mail date Nov. 29, 2012, 6 pages.
Office Action for U.S. Appl. No. 12/474,102, mail date Sep. 7, 2011, 8 pages.
Office Action for U.S. Appl. No. 13/717,052, mail date Aug. 22, 2013, 15 pages.
Office Action on U.S. Appl. No. 12/075,103 Dated Jul. 31, 2013, 8 pages.
Pessi et al., On the Relationship Between Lightning and Convective Rainfall Over the Central Pacific Ocean, date unknown, 9 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.
Decision on Appeal for Inter Parties Reexamination Control No. 95/001,860, dated Oct. 17, 2014, 17 pages.
Final Office Action on U.S. Appl. No. 12,892,663 dated Mar. 7, 2013, 13 pages.
Final Office Action on U.S. Appl. No. 13/238,606 Dated Apr. 1, 2014, 11 pages.
Final Office Action on U.S. Appl. No. 13/238,606 Dated Jan. 22, 2015, 6 pages.
Non-Final Office Action on U.S. Appl. No. 12/892,663 Dated May 29, 2013, 14 pages.
Non-Final Office Action on U.S. Appl. No. 13/238,606 Dated Jul. 8, 2014, 12 pages.
Non-Final Office Action on U.S. Appl. No. 13/238,606 Dated Sep. 23, 2013, 15 pages.
Non-Final Office Action on U.S. Appl. No. 13/717,052 Dated Feb. 11, 2015, 15 pages.
Notice of Allowance on U.S. Appl. No. 13/246,769 Dated Jan. 8, 2015, 10 pages.
Notice of Allowance on U.S. Appl. No. 13/707,438 Dated Feb. 25, 2015, 11 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
3-D Weather Hazard and Avoidance System, Honeywell InteVue Brochure dated Nov. 2008, 4 pages.
Greene et al., Vertically Integrated Liquid Water—A New Analysis Tool, Monthly Weather Review, Jul. 1972, 5 pages.
Kuntman, Satellite Imagery: Predicting Aviation Weather Hazards, ICAO Journal, Mar. 2000, 4 pages.
Office Action on U.S. Appl. No. 12/075,103 Dated Apr. 9, 2014, 5 pages.
Office Action on U.S. Appl. No. 13/246,769 Dated Apr. 21, 2014, 18 pages.
Office Action on U.S. Appl. No. 13/717,052 Dated Dec. 23, 2013, 7 pages.
RDR-4B Honeywell User Manual for Forward Looking Windshear Detection/Weather Radar System, Rev. 6, Jul. 2003, 106 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
US Office Action on U.S. Appl. No. 13/717,052 Dated Mar. 27, 2014, 6 pages.
U.S. Appl. No. 13/246,769, filed Sep. 27, 2011, Rockwell Collins.
Non-Final Office Action on U.S. Appl. No. 14/452,235 Dated Apr. 23, 2015, 9 pages.
Non-Final Office Action on U.S. Appl. No. 14/681,901 Dated Jun. 17, 2015, 21 pages.
Non-Final Office Action on U.S. Appl. No. 13/913,100 Dated May 4, 2015, 25 pages.
Non-Final Office Action on U.S. Appl. No. 13/919,406 Dated Jul. 14, 2015, 23 pages.
Office Action for U.S. Appl. No. 12/892,663, mail date Oct. 22, 2012, 12 pages.

* cited by examiner

SYSTEM AND METHOD FOR ICE DETECTION

CROSS-REFERENCE TO RELATED APPLICATIONS

The present application is related to U. S. application Ser. No. 13/717,052, filed on Dec. 17, 2012, which is a Continuation of U.S. application Ser. No. 12/075,103, filed on Mar. 7, 2008, entitled "SYSTEM AND METHOD FOR TURBULENCE DETECTION" by Woodell et al., both of which are incorporated herein by reference in their entireties and assigned to the Assignee of the present application. U.S. patent application Ser. No. 11/370,085, now U.S. Pat. No. 7,515,087, U.S. patent application Ser. No. 11/402,434, now U.S. Pat. No. 7,486,219, U.S. patent application Ser. No. 11/256,845, now U.S. Pat. No. 7,598,902, and U.S. patent application Ser. No. 10/631,253 now U.S. Pat. No. 7,129,885 are herein incorporated by reference in their entireties.

BACKGROUND

This application relates generally to the detection of ice or ice crystals in the atmosphere.

Hazardous weather is generally associated with convective weather cells. Convective weather cells can produce turbulence, high winds, lightning, hail, and other weather hazards. In addition, convective cells can provide large updrafts that loft large amounts of moisture to higher altitudes (e.g., high portions troposphere). The moisture can be super cooled liquid at temperatures much colder than the freezing point of water because the water was lofted quickly by the updraft and has not encountered condensation nuclei upon which to crystallize as ice.

Non-convective rain clouds (e.g., stratiform rain) can also include ice crystals. Non-convective rain clouds are striated with temperature. At low altitudes where the temperature is above the freezing point, liquid water is present as rain. At high altitudes where the temperature is below the freezing point, ice crystals form.

Conventional aircraft hazard weather radar systems, such as the WXR 2100 MultiScan™ radar system manufactured by Rockwell Collins, Inc., have Doppler capabilities and are capable of detecting at least four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta. Such weather radar systems can conduct vertical sweeps and obtain reflectivity parameters at various altitudes and can detect the presence of ice using reflectivity parameters and temperature. However, such detection of ice cannot be performed at longer ranges. In some embodiments, the radar may be a single frequency radar (e.g., X-band radar) or a multi-frequency radar (e.g., a radar with both X-band and Ka-band frequencies). In some embodiments, the single or multi-frequency radar may include polarization diversity capabilities.

Ice or ice crystal formation at high altitudes can pose various threats to aircraft. Flying through ice or ice crystal formation at high altitudes can cause engine roll back, engine stall, engine flameout, and incorrect airspeed measurements. Detecting areas of ice and ice crystal formation at longer ranges is desirable so that pilots can avoid such areas.

Thus, there is a need for a system and method for more accurate, long range detection of ice and/or ice crystals high in the troposphere. There is also a need for inferring the existence of ice and/or ice crystals based on the detection and analysis of convective cells or hazards associated therewith. There is also a need to distinguish highly convective ice crystal formation areas form non-convective stratiform rain areas that do not produce high altitude ice crystals. Further still, there is a need to detect and locate convective cells by measuring the amount of moisture (e.g., liquid water, such as total water content) present at altitudes where the temperature is below the freezing point. Yet further, there is a need for a aircraft hazard warning system optimized to determine the location and presence of large areas of high altitude ice resulting from convective cell blow off. Further, there is a need for a aircraft hazard warning system that includes inferential ice detection and location.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to an aircraft weather radar system. The aircraft weather radar system can include a radar antenna and a processor. The radar antenna receives radar returns, and a processor. The processor can be configured for: 1. indentifying on a display a region of potential ice associated with a blow off region in response to the radar returns, temperature data, and wind data; or 2. identifying on a display a region of potential ice associated with a stratiform region in response to radar returns, temperature data, and a history of convective cells in the stratiform region.

Another embodiment of the disclosure relates to a method of displaying an indication of a presence of ice on an aircraft display in an avionics system. The method includes receiving radar reflectivity data and temperature data and determining a presence of at least one stratiform rain area, determining whether at least one convective cell was present in the stratiform rain area, and providing the indication in response to a size of the stratiform rain area.

Another embodiment of the disclosure relates a method of displaying an indication of a presence of ice on an aircraft display in an avionics system. The method includes receiving radar reflectivity data and temperature data and determining a presence of at least one convective cell, and providing the indication at least in part in response to a wind parameter and a size of the convective cell.

Another embodiment relates to an aircraft hazard warning system. The aircraft hazard warning system includes a processing system for determining a presence of ice crystals. The processing system receives radar reflectivity data, and temperature data, and determines an ice crystal warning by: 1. determining a size of a convective cell using the radar reflectivity data, and temperature data and determining a blow off area associated with the convective cell in response to the size and a wind direction parameter, the blow off area being an area where ice crystals migrate due to wind; or 2. determining a size of a stratiform region and determining a presence of a convective cell previously in the stratiform region.

Another exemplary embodiment relates to an apparatus for determining a presence of a convective cell in an environment of an aircraft. The apparatus includes an input for radar reflectivity data and temperature data, and a processing system for determining the presence of the convective cell. The processing system receives the radar reflectivity data and the temperature data and determines the presence of the convective cell by determining an amount of liquid water present at altitudes above the freezing point.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
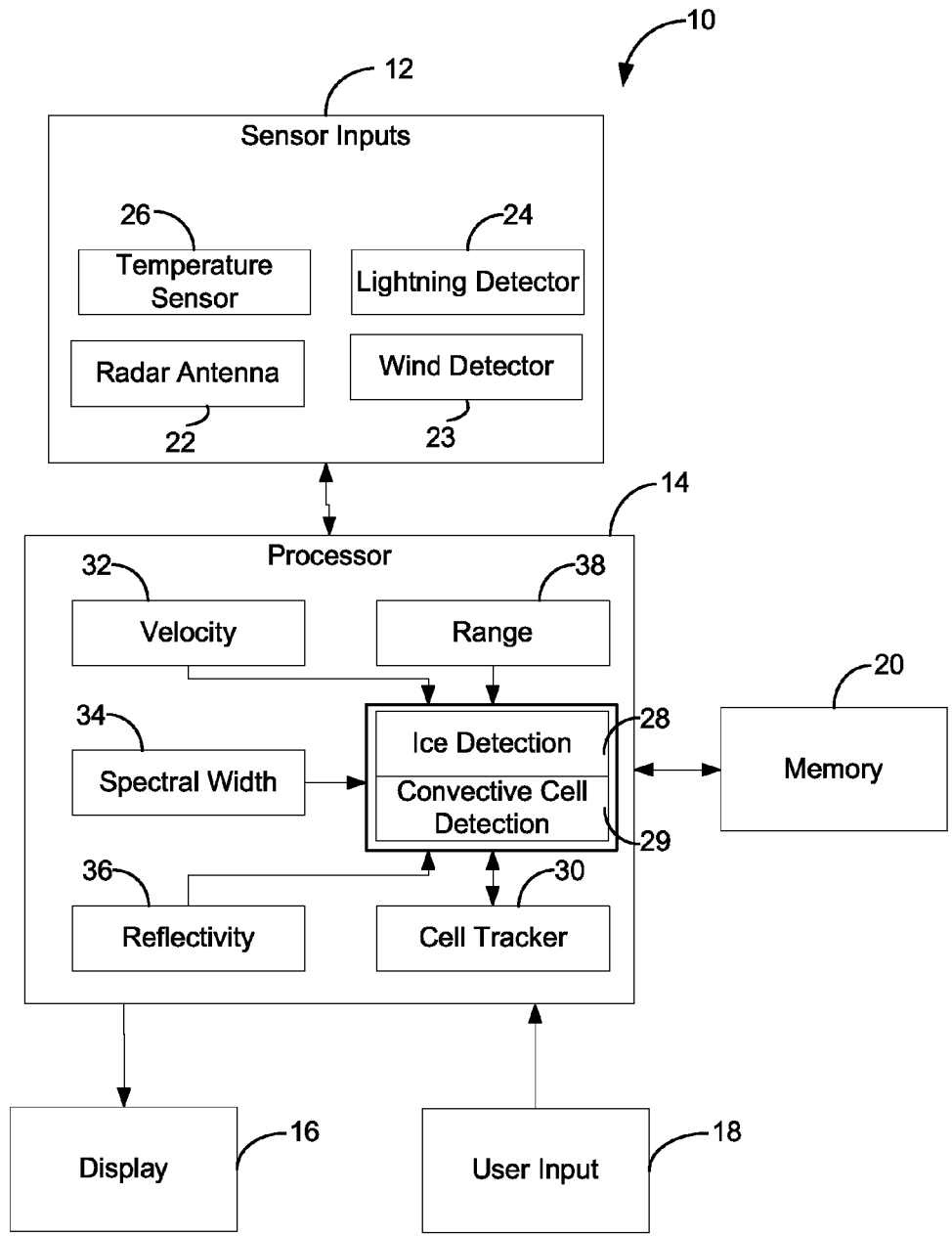
FIG. 1 is a block diagram of a hazard warning system according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

An aircraft hazard warning system or other avionic system may infer or otherwise detect ice or ice crystals and provide a warning with respect to the geographical location and/or altitude of the ice crystals in one embodiment. The hazard warning system can detect blow off regions above convective regions as regions of inferred ice crystal detection in one embodiment. The hazard warning system can detect ice hazard regions associated with stratiform rain that follows convective cells in another embodiment. The system can combine direct detection of ice particles with inferred detection of ice particles to provide a unified indication of hazard. Alternatively, inferred detection of ice particles can use a different indication than direct detection.

The current regulatory environment as defined by governmental regulatory agencies supports display of basic radar sensor information as red, yellow, and green for radar reflectivity calibrated to rainfall rate and magenta as turbulence. The regulatory agencies do not currently provide guidance for changing the definition of the radar display based on inferred hazards. The radar display format may be selected to display radar colors consistent with turbulence and rainfall rate as currently defined by regulatory authorities or as defined in the future by such authorities. A hazard assessment indication can be provided in a manner that does not interfere with display of standard weather data. In one embodiment, a speckled yellow region is used for areas where ice is detected (directly or inferred) in a horizontal view and a vertical view on a weather radar display.

Referring to FIG. 1, a weather radar system or hazard warning system 10 includes sensor inputs 12, a processor 14, a display 16, a user input 18, and a memory 20. Hazard warning system 10 may acquire horizontal and/or vertical reflectivity profiles and direct turbulence detection information via sensor inputs 12. Sensor inputs 12 generally include a radar antenna 22, a wind detector 23, a lightning detector 24, and a temperature sensor 26. According to other exemplary embodiments, sensor inputs 12 may include any type of sensor or detector that may provide data related to direct or inferred measurement or detection of weather conditions and/or hazards.

Wind detector 23 can be part of processor 14 or separate from processor 14. Detector 23 provides a wind parameter. The wind parameter can be high altitude wind speed and direction data. The data can be calculated form track angle and heading of the aircraft, or be provided by the flight management system (FMS) or other navigation equipment. The wind parameter data can also be provided by a source remote from the aircraft.

In one embodiment, the hybrid approach of hazard warning system 10 correlates radar reflectivity and lightning data to overcome the shortcomings of the lightning strike inaccuracy. The hybrid approach determines lightning strike position relative to radar reflectivity measurements, with sufficient accuracy, to make a convective assessment on a weather event.

Processor 14 is generally configured to process data received from sensor inputs 12 to determine a hazard threat level, receive input from user input 18, and provide hazard indication on display 16. Processor 14 includes ice detector 28, convective cell detector 29, and cell tracker 30. Processor 14 can generate a velocity parameter 32 or other Doppler data, a spectral width parameter 34, a reflectivity parameter 36, and a range parameter 38 based on return data from sensor inputs 12, data or commands from user input 18, or data or instructions from memory 20. According to various exemplary embodiments, processor 14 can be any hardware and/or software processor or processing architecture capable of executing instructions and operating on data related to hazard detection. According to various exemplary embodiments, memory 20 can be any volatile or non-volatile memory capable of storing data and/or instructions related to hazard warning system 10.

Ice detector 28 is configured to provide inferred detection of regions of based upon the strength of a convective cell ice in one embodiment. In one embodiment, convective cell detector 29 uses vertical sweeps on weather cells to assess the vertical extent of moisture with respect to altitude. Air temperature data from sensor 26 (e.g., temperature measurements) can be used to assess air temperature with respect to altitude. Detector 29 can use the combination of reflectivity and temperature to determine the convective strength of the cell.

Temperature data can include a local atmospheric temperature, local temperature variations with time, local temperature variations with altitude, a remotely determined temperature, and/or remotely determined temperature gradients in either range or altitude. Detector 29 can receive data inputs derived from one or more of spectral width parameter 34, reflectivity parameter 36, and/or range parameter 38 to assess and locate convective cells.

Detector 28 can use the assessed convective strength of the cell to determine the updraft potential of the cell and hence, the potential of the cell to loft moisture high into the atmosphere where ice crystals form. Higher indications of reflectivity at higher altitudes and lower temperatures indicates a stronger cell and greater potential for ice formation. A specific reflectivity at an altitude where the temperature is at or below the freezing level may indicate the presence of a convective cell. Accordingly, areas above such cells are indicated as warning areas associated with ice. Weaker or smaller cells have less probability of up drafting moisture that forms ice.

In addition, processor 14 can use a direct measurement of spectral width, for example spectral width parameter 34, from radar antenna 22 to assess the strength of the convective cell. In one embodiment, processor 14 can use a hybrid approach of that correlates radar reflectivity and lightning data from detector 24 to make a convective assessment on a weather event.

The detection of lightning generally indicates the presence of a convective cell and of turbulence within the cell. Detection of a single lightning bolt can infer the presence of a convective cell. The use of lightning history data may provide a more accurate inferred convective cell assessment. If lighting history indicates a high lighting strike rate in a given cell the probability of convection with high magnitude within that cell is high.

Reflectivity parameter 36 can include data related to area reflectivity, gradient reflectivity, magnitude reflectivity, reflectivity shape, and/or a sharp change in reflectivity. Very high gradients (e.g., rapid changes from red to black to yellow) can indicate the presence of a convective cell and thus turbulence. According to one exemplary embodiment, the very high gradient may be a change in cell reflectivity within a few range bins (e.g., one nautical mile). According to another exemplary embodiment, the very high gradient may be a change in cell reflectivity within three nautical miles. In some embodiments, reflectivity information can be used to compute an area and/or volume of reflectivity, and the area and/or volume of reflectivity can be used to determine the convective level associated with the cell. In some embodiments, the volume of reflectivity may be translated into a Vertical Integrated Reflectivity measure. Further information regarding computation of areas and/or volumes of reflectivity can be found in the copending U.S. Patent Application titled "Weather Hazard Threat Level Computation and Display", filed concurrently with the present application and listing as inventors K. Kronfeld, R. Robertson, and G. Koenigs, which is incorporated herein by reference in its entirety.

If a cell is detected to be growing at a very high rate, it may be a convective cell containing turbulence. If a cell is detected that has grown at a very high rate in the past, the cell may be convective and contain turbulence. For example, the growth may be detected by a vertical structure analysis. The vertical structure analysis data may include vertical height, vertical growth rate, a vertical history assessment, an assessment of whether the aircraft path will intersect a portion of a weather cell, and/or cell maturity data.

In one embodiment, detector 29 can determine the amount of liquid water at altitudes at temperatures below the freezing point as an indication of a strong convective cell. Amount of liquid can be detected using the reflectivity parameter. In this way, detector 29 can distinguish between non-convective and convective cells because convective cells cause larger amounts of super cooled water to be up drafted above the freezing point altitude.

Convective cell detector 29 can process at least one of parameters 34, 36, 38 and/or data from detector 24 to provide a convective hazard indication on display 16. In addition, detector 29 can cause system 10 to perform further analysis in response to information from lightning detector 24 and/or a parameter 34, 36, 38. The further analysis can even include causing system 10 to perform weather radar queuing and control in elevation and azimuth as well as examining new data or historical data.

After acquiring data from sensor inputs 12, processor 14 may use a variety of processing techniques to assess the ice hazard levels and regions. Processor 14 may identify and track relevant weather cells via cell tracker 30. The cells may be prioritized in terms of their threat to the aircraft and detailed vertical scans can be conducted on high priority targets. Tracker 30 can store a history of cell locations and cell characteristics including but not limited to cell strength, size, vertical height, vertical growth rate, and/or cell maturity data.

Ice detector 28 uses data associated with areas around convective cells and former convective cells to provide warnings related to the potential presence of ice or actual presence of ice. In one embodiment, ice detector 28 can advantageously detect large areas of high altitude ice resulting from convective blow off or from areas of old convection which are difficult to detect using conventional techniques. Ice in these areas is difficult to detect because convective cells are not necessarily located in the regions (e.g., areas of zero convectivity). Generally, it is more difficult to detect ice crystals with conventional techniques when the ice crystals are not being actively formed such as in blow off regions or stratiform rain regions.

Blow off regions are areas of ice presence due to ice crystals being blown from the top of a convective cell by high altitude winds. High altitude ice can also remain above old convective cells (no longer existing cells). A convective cell is an old convective cell if it existed over the region within a predetermined amount of time (e.g., past 5 minutes, past 10 minutes, etc.). Applicants believe that such high altitude ice is generally present over the area associated with old strong convective cells or multiple old convective cells that is occupied by stratiform rain clouds. The larger the stratiform rain area that follows the old convective cell and the more embedded cells of convectivity in the stratiform rain region, the higher the likelihood of presence of ice. Stored history of cell locations and characteristics can be used to identify whether an old convective cell existed in the region and its characteristics while in the region.

Figure 2:
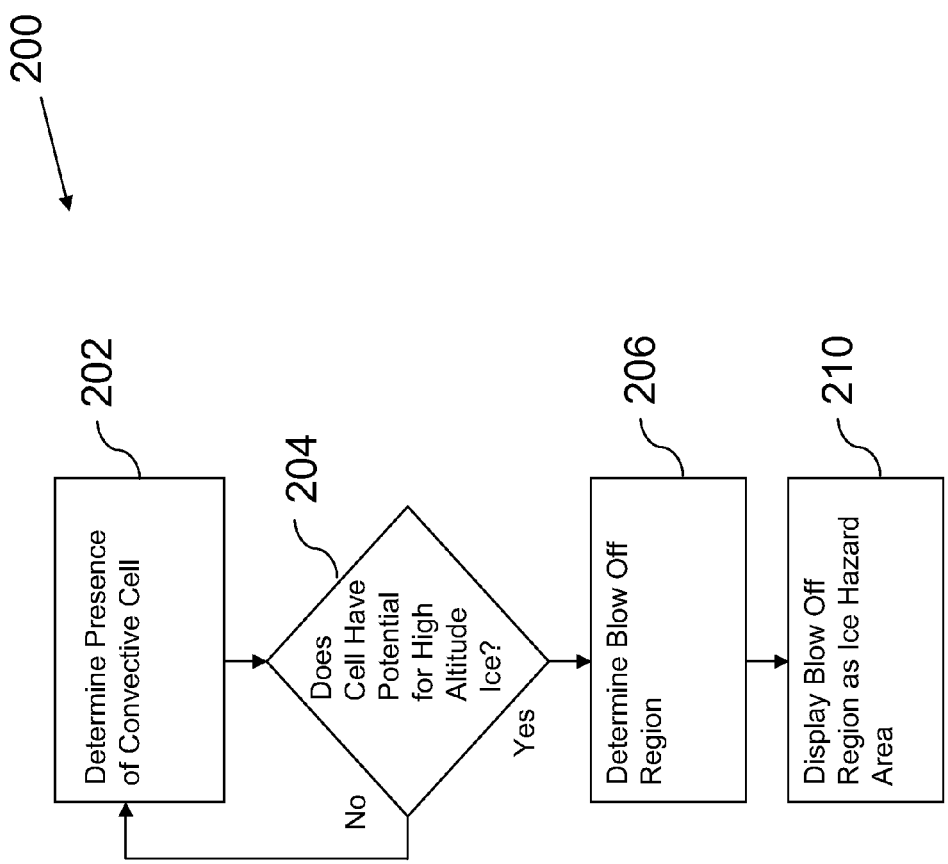
FIG. 2 is a functional flow diagram of a process executed in the hazard warning system of FIG. 1 according to an exemplary embodiment.

With reference to FIG. 2, a method 200 can be performed by system 10 to provide a warning of a presence of ice in the vicinity of an aircraft. At a step 202, convective cell detector 29 can detect one more convective cell by any technique. In one embodiment, convective cells can be identified and located using weather radar data. For example, processor 14 can detect the presence of reflectivity at a certain range (e.g., 100, 80, 40 nautical miles) and perform a vertical sweep to determine a level of conductivity in accordance with the algorithms discussed in the patents and applications incorporated herein by reference. In one embodiment, detector 29 can use vertical structure analysis. In one embodiment, the size and location of the convective cell is obtained.

At a step 204, the convective cell is assessed to determine if the cell has a potential for providing high altitude ice by detector 28. Generally, the larger and stronger the cell, the higher the probability of providing high altitude ice. High altitude ice can be directly sensed using radar returns in one embodiment. If there is a potential for high altitude ice formation, detector 28 determines a size and location of the blow off region at a step 206. If there is no or less potential for high altitude ice formation, processor 14 can return to step 202.

In some embodiments, the radar or avionics equipment may receive uplink or off-aircraft information regarding detected and/or forecast regions with icing or icing potential. The radar may be used to qualify or confirm the assessment by adjusting radar parameters when scanning the detected regions (e.g., gain, etc.), increasing the dwell time in those regions, performing additional scans in those regions, etc. The off-aircraft assessment may be used to increase the confidence in the icing assessment and be used to display an icing hazard warning in that region. In some embodiments, the uplink or remote information (e.g., from ground, other aircraft, satellite, etc.) may include an observation or forecast of one or more of weather information of interest, including icing potential, convective level, size, maturity, reflectivity, winds, temperature, etc. The information can be utilized in performing the icing threat assessment. The icing threat assessment and information originating on the aircraft for the icing assessment may also be down linked or sent to a ground station or off-aircraft system, so that the off-aircraft system can aggregate multiple aircraft observations for the development of a global icing map or global icing forecast that can then be uplinked to other aircraft in the vicinity or using the airspace in the future.

At step 206, detector 28 uses a high altitude wind parameter and the strength of the convective to determine the size and location of the blow off region. The size and location of the blow off region is determined from the wind speed and direction. The size is generally greater if the strength of the convective cell is greater and the wind speed is greater. At a step 210, the blow off region is displayed as a hazard or warning area. The blow off region can be displayed as a speckled yellow or red area, other color region, or with other symbols. After step 210, processor 14 can return to step 202. In some embodiments, an overshooting top may indicate a cell spreading out regardless of wind speed. For example, a cell could spread in all directions even if there is no significant wind or a downwind condition is present.

In some embodiments, the radar response may be received from a multi-frequency radar system, and the radar response from at least two frequencies may be compared to determine the likelihood of ice formation. The difference or ratio between the signals can be used to separate ice detection from traditional rain detection. For example, the larger the response differences from the two frequencies, the greater the likelihood is that the response is from icing.

In some embodiments, the radar response may be received from a polarization diversity radar system, and the radar response from at least two polarization diverse radar signals are compared. The difference or ratio between the signal may be used to separate ice detection from traditional rain detection. For example, the larger the ratio between the horizontal and vertical polarization radar signals, the greater the likelihood that the response is from icing.

In some embodiments, the icing assessment may not be binary (i.e., may not be merely "ice threat" or "no ice threat"). The icing assessment may include a scaled assessment, such that the icing threat potential is identified as one of several levels (e.g., low/medium/high, number on a numerical scale, etc.). In some embodiments, colors, shading, patterns, symbols, icons, etc. used to display the icing threat may be mapped to the different graduated icing levels.

In some embodiments, the icing assessment may be predictive. Weather information associated with a region may indicate an increasing likelihood of icing or may indicate a weather trend that, if it continues, may result in the region experiencing some icing at a future time. In some embodiments, prediction based on regional weather information and/ or weather trends may be utilized, alone or in combination with other factors described herein, to provide a predictive icing assessment. In some embodiments, colors, shading, patterns, symbols, icons, etc. may be used to indicate that a displayed threat is related to a predictive icing assessment.

Figure 3:
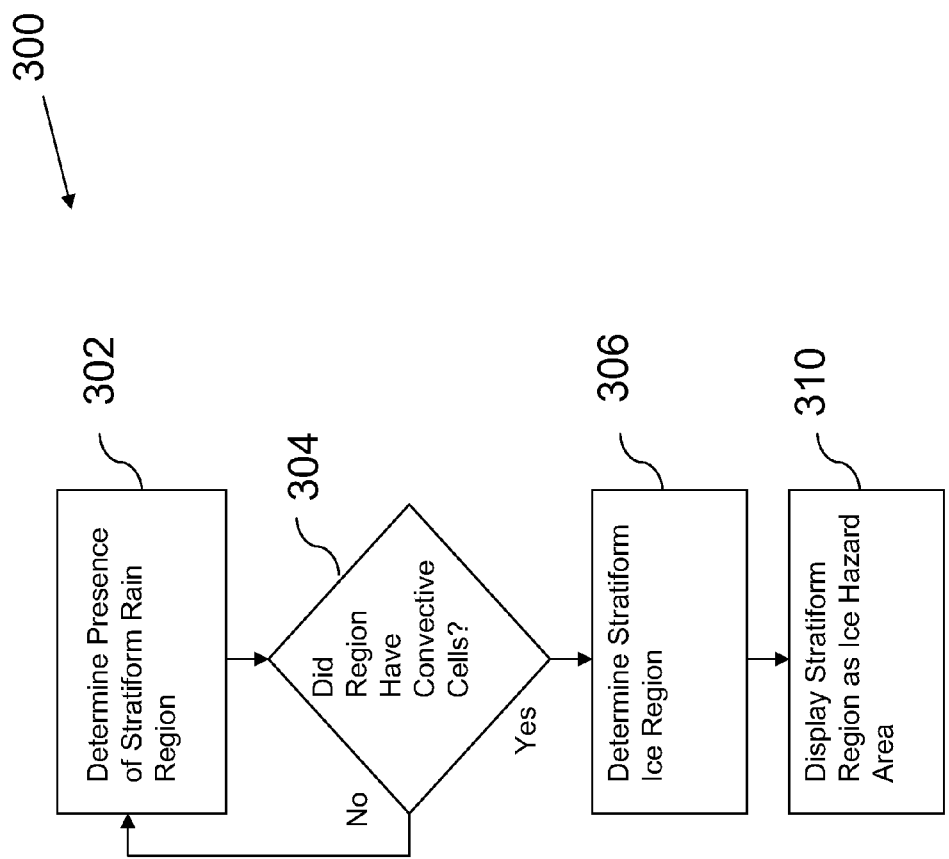
FIG. 3 is a functional flow diagram of a process executed in the hazard warning system of FIG. 1 according to an exemplary embodiment.

With reference to FIG. 3, a method 300 can be performed by system 10 to provide a warning of a presence of ice in the vicinity of an aircraft. At a step 302, convective cell detector 29 can detect stratiform rain by any technique. In one embodiment, stratiform rain can be located using weather radar data. In one embodiment, detector 29 can determine stratiform rain in response to a reflectivity parameter and a spectral width parameter which indicate the presence of rain without convection. Other techniques for identifying stratiform rain can be utilized.

At a step 304, the area associated with the stratiform rain is analyzed to determine whether a convective cell or front of convective cells existed within a predetermined time. Detector 29 can use cell tracker to determine whether an old convective cell existed in the region of interest. For example, a Midwestern United States squall line can produce convective cells behind the squall line in areas of stratiform rain. A high density of these conductive cell indicates a higher probability of ice regions.

If an old convective cell existed, processor 14 advances to a step 306 and detector 28 determines an ice region based upon the size of the stratiform rain and the number of old convective cells associated with the region. If an old convective cell did not exist, processor 14 returns to step 302. The size of a cell is generally directly proportional to the age/ longevity or maturity of the cell.

Generally, the larger the stratiform rain region and the more embedded cells, the larger region of potential ice crystals. Detector 28 can determines a size and location of the ice region using wind data.

At a step 310, the ice region is displayed as a hazard or warning area. The ice region can be displayed as a speckled yellow area, other color region, or with other symbols or icons. After step 310, processor 14 can return to step 302.

Figure 4:
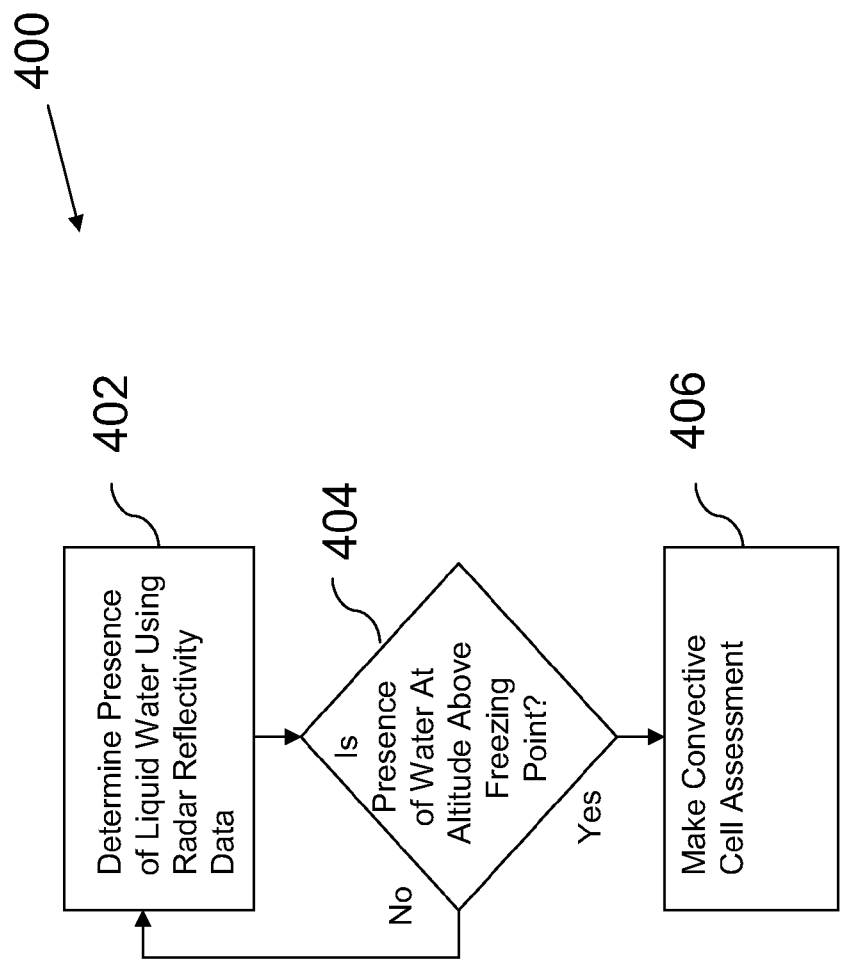
FIG. 4 is a functional flow diagram of a process executed in the hazard warning system of FIG. 1 according to an exemplary embodiment.

With reference to FIG. 4, a method 400 can be performed by system 10 to determine a presence of a convective in the vicinity of an aircraft by detector 29. At a step 402, convective cell detector 29 detects presence of liquid water using weather radar data (e.g., reflectivity parameters). Vertical radar scans can be performed by system 10 to obtain the weather radar data for step 402. At a step 404, detector 29 can determine the amount of water at altitudes above the freezing point using the weather radar data and temperature data. If liquid water is present above the altitude associated with the freezing point, processor 14 advances to a step 406 and detector 289 makes a convective cell assessment. The convective cell assessment can include a vertical structure assessment in one embodiment. Water has a higher reflectivity in liquid form than in ice form. If liquid water is not present above the altitude associated with the freezing point, processor 14 returns to step 402.

According to various exemplary embodiments, methods 200, 300 and 400 of FIGS. 2-4 may be embodied as hardware and/or software. In exemplary embodiments where the processes are embodied as software, the processes may be executed as computer code on any processing or hardware architecture or in any weather radar system such as the WXR-2100 available from Rockwell Collins. Methods 200, 300, and 400 can be performed separately, simultaneously, sequentially or independently with respect to each other.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. An aircraft hazard warning system, comprising:
   an electronic processing system for determining a presence of ice crystals, the processing system being configured to receive radar reflectivity data and temperature data, the processing system being configured to determine an ice crystal warning by:
   1. determining a size of a convective cell using the radar reflectivity data and temperature data and determining a blow off area associated with the convective cell in response to the size and a wind direction parameter, the blow off area being an area where ice crystals migrate due to wind; or
   2. determining a size of a stratiform region and determining a presence of a convective cell previously in the stratiform region; and
   3. wherein the radar reflectivity data comprises reflectivity data corresponding to at least two frequencies from a multi-frequency radar system, and wherein the processing system is configured to determine the ice crystal warning based at least in part on a comparison of the reflectivity data corresponding to the at least two frequencies from the multi-frequency radar; or
   4. wherein the radar reflectivity data comprises at least two polarization diverse radar signals received from a polarization diversity radar system, and wherein the processing system is configured to determine the ice crystal warning based at least in part on a comparison of the at least two polarization diverse radar signals.

2. The aircraft hazard warning system of claim 1, wherein the ice crystal warning is provided as a speckled yellow or red region at least partially corresponding to the blow off area.

3. The aircraft warning system of claim 1, wherein the ice crystal warning is provided as a speckled yellow or red region, and is provided at least partially in response to the size of the stratiform region.

4. The aircraft warning system of claim 1, wherein the ice crystal warning is provided at least partially in response to the size of the stratiform region and a number of embedded cell cores in the stratiform region, wherein the embedded core cells are convective cells in the stratiform region detected using vertical structure analysis.

5. An aircraft hazard warning system, comprising:
   an electronic processing system being configured to determine a presence of ice crystals, the processing system being configured to receive radar reflectivity data and temperature data, the processing system being configured to determine an ice crystal warning by:
   1. determining a size of a convective cell using the radar reflectivity data and temperature data and determining a blow off area associated with the convective cell in response to the size and a wind direction parameter, the blow off area being an area where ice crystals migrate due to wind; or
   2. determining a size of a stratiform region and determining a presence of a convective cell previously in the stratiform region, wherein the wind direction parameter is computed by using a track angle of an aircraft, a heading of the aircraft, and an airspeed of the aircraft.

6. The aircraft hazard warning system of claim 1, wherein the wind direction parameter is provided by a flight management system.

7. The aircraft hazard warning system of claim 1, wherein the processing system is part of an avionic weather radar system.

8. The aircraft hazard warning system of claim 1, wherein the ice crystal warning is provided as an icon.

9. The aircraft hazard warning system of claim 1, wherein the radar reflectivity data comprises reflectivity data corresponding to at least two frequencies from a multi-frequency radar system, and wherein the processing circuit is configured to determine the ice crystal warning based at least in part on a comparison of the reflectivity data corresponding to the at least two frequencies from the multi-frequency radar system.

10. The aircraft hazard warning system of claim 1, wherein the radar reflectivity data comprises at least two polarization diverse radar signals received from a polarization diversity radar system, and wherein the processing circuit is configured to determine the ice crystal warning based at least in part on a comparison of the at least two polarization diverse radar signals.

11. The aircraft hazard warning system of claim 1, wherein the processing system is configured to receive data from one or more off-aircraft sources, and wherein the processing circuit is configured to determine the ice crystal warning based at least in part on the data received from the one or more off-aircraft sources.

12. An aircraft hazard warning system, comprising:
   an electronic processing system configured to determine a presence of ice crystals, the processing system styled to receive radar reflectivity data and temperature data, the processing system configured to determine an ice crystal warning by:
   1. determining a size of a convective cell using the radar reflectivity data and temperature data and determining a blow off area associated with the convective cell in response to the size and a wind direction parameter, the blow off area being an area where ice crystals migrate due to wind; or 2. determining a size of a stratiform region and determining a presence of a convective cell previously in the stratiform region, wherein the processing system is configured to cause an icing assessment based on the ice crystal warning to be transmitted to an off-aircraft source, for generation of a global icing forecast based on the icing assessment and data received from a plurality of other aircraft hazard warning systems.

13. The aircraft hazard warning system of claim 1, wherein the processing circuit is configured to determine a convective level of the convective cell based on at least one of an area and a volume of reflectivity.

14. An aircraft hazard warning system, comprising:
an electronic processing system configured to determine a presence of ice crystals, the processing system configured to receive radar reflectivity data and temperature data, the processing system configured to determine an ice crystal warning by:
1. determining a size of a convective cell using the radar reflectivity data and temperature data and determining a blow off area associated with the convective cell in response to the size and a wind direction parameter, the blow off area being an area where ice crystals migrate due to wind; or
2. determining a size of a stratiform region and determining a presence of a convective cell previously in the stratiform region, wherein the ice crystal warning comprises an indicator showing a plurality of graduated icing levels on an electronic display.

15. An aircraft hazard warning system, comprising:
an electronic processing system configured to determine a presence of ice crystals, the processing system configured to receive radar reflectivity data and temperature data, the processing system configured to determine an ice crystal warning by:
1. determining a size of a convective cell using the radar reflectivity data and temperature data and determining a blow off area associated with the convective cell in response to the size and a wind direction parameter, the blow off area being an area where ice crystals migrate due to wind; or
2. determining a size of a stratiform region and determining a presence of a convective cell previously in the stratiform region, wherein the processing system is configured to determine the ice crystal warning based at least in part on a predictive icing assessment, wherein the predictive icing assessment is based on a likelihood of icing indicated by weather data associated with a region being analyzed by the processing system.

16. A method of displaying an indication of a presence of ice on an aircraft display in an avionics system, the method comprising:
receiving radar reflectivity data from a radar system and temperature data from a temperature sensor and determining a presence of at least one convective cell using an electronic processor; and
providing the indication on the aircraft display at least in part in response to a wind parameter from a wind detector and a size of the convective cell, wherein the presence of the convective cell is determined using atmospheric temperature data comprising one or more of: local temperature, local temperature variations with time, local variations with altitude, remotely determined temperature, and remotely determined temperature gradients in either range or altitude.

17. The method of claim 16, wherein the wind parameter is a high altitude parameter.

18. The method of claim 17, wherein the wind parameter comprises a speed and a direction.

19. The method of claim 16, wherein vertical structure analysis data is used to determine the presence of the convective cell and comprises one or more of: vertical height, vertical growth rate, vertical history assessment, assessment of whether the aircraft path will intersect a portion of a weather cell, and cell maturity.

20. The method of claim 16, wherein lightning data is used to determine the presence of the convective cell.

21. A method of displaying an indication of a presence of ice on an aircraft display in an avionics system, the method comprising:
receiving radar reflectivity data from a radar system and temperature data from a temperature sensor and determining a presence of at least one convective cell using an electronic processor; and
providing the indication on the aircraft display at least in part in response to a wind parameter from a wind detector and a size of the convective cell, wherein the presence of the convective cell is determined by using the temperature data and the reflectivity data to determine an amount of liquid water at altitudes where a temperature is below the freezing point.

22. The method of claim 21, wherein the temperature data comprises atmospheric temperature data comprising one or more of: local temperature, local temperature variations with time, local variations with altitude, remotely determined temperature, and remotely determined temperature gradients in either range or altitude.

23. The method of claim 21, further comprising:
determining a presence of at least one stratiform rain area using the reflectivity data and the temperature data;
determining whether at least one convective cell was present in the stratiform rain area; and
providing the indication at least in part in response to a size of the stratiform rain area.

24. The method of claim 23, wherein the indication is provided in response to a number of convective cells being formerly present in the stratiform rain area.

25. The method of claim 24, wherein the indication is a yellow or red speckled region.

26. An aircraft weather radar system, comprising:
a radar antenna for receiving radar returns; and
a processor for:
1. identifying on a display a region of potential ice associated with a blow off region, the blow off region being an area where ice crystals migrate due to wind, a size and location of the blow off region being determined in response to the radar returns, temperature data, and wind data from a wind detector.

27. An aircraft weather radar system, comprising:
a radar antenna for receiving radar returns; and
a processor for:
1. identifying on a display a region of potential ice associated with a blow off region in response to the radar returns, temperature data, and wind data; or
2. identifying on a display a region of potential ice associated with a stratiform region in response to the radar returns, temperature data, and a history of convective cells in the stratiform region, wherein the processor is configured to perform both:

1. identifying on a display a region of potential ice associated with a blow off region in response to radar returns, temperature data, and wind data; and
 2. identifying on a display a region of potential ice associated with a stratiform region in response to radar returns, temperature data, and a history of convective cells in the stratiform region.

28. The aircraft weather radar system of claim 27, wherein the indication is a yellow or red speckled region.

29. An aircraft hazard warning system, comprising:
   an onboard multi-frequency radar system or an onboard polarization diversity radar system;
   an electronic processing system configured to determine a presence of ice crystals, the processing system being configured to receive radar reflectivity data and temperature data, wherein the radar reflectivity data comprises reflectivity data corresponding to at least two frequencies from the multi-frequency radar system or at least two polarization diverse radar signals received from the polarization diversity radar system, the processing system being configured to determine an ice crystal warning by:
   comparing the reflectivity data corresponding to the at least two frequencies from the multi-frequency radar or comparing the at least two polarization diverse radar signals from the polarization diversity radar system.

30. The aircraft hazard warning system of claim 29, comprising the onboard multi-frequency radar system and the processing system is configured to compare the reflectivity data corresponding to the at least two frequencies from the multi-frequency radar.

31. The aircraft hazard warning system of claim 29, comprising the polarization diversity radar system and the processing system is configured to compare the reflectivity data corresponding to the at least two polarization diverse radar signals from the polarization diversity radar system.

* * * * *